(12) United States Patent
Tanaka et al.

(10) Patent No.: US 6,521,161 B1
(45) Date of Patent: Feb. 18, 2003

(54) METHOD FOR MANUFACTURING A GOLF BALL

(75) Inventors: Takayuki Tanaka, Kobe (JP); Naoki Baba, Kobe (JP); Hiroaki Tanaka, Kobe (JP); Hiroshi Hirata, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 0 days.

(21) Appl. No.: 09/476,365

(22) Filed: Jan. 3, 2000

(30) Foreign Application Priority Data

Jan. 18, 1999 (JP) .......................... 11-008933

(51) Int. Cl.⁷ .................. B29C 43/18; B29C 43/20
(52) U.S. Cl. ................. 264/279.1; 264/248; 264/297.5; 264/319; 264/325
(58) Field of Search .............................. 264/278, 279.1, 264/248, 320, 322, 325, 297.5, 319

(56) References Cited

U.S. PATENT DOCUMENTS 5,407,341 A * 4/1995 Endo et al. .................. 425/116
6,168,407 B1 * 1/2001 Kasashima et al. ......... 425/116

FOREIGN PATENT DOCUMENTS

JP            B2316244           3/1991

\* cited by examiner

*Primary Examiner*—Jan H. Silbaugh
*Assistant Examiner*—Edmund H. Lee
(74) *Attorney, Agent, or Firm*—Birch, Stewart, Kolasch & Birch, LLP

(57) ABSTRACT

A manufacturing method for an one-piece ball formed with vulcanization in which a partial mold has eight grooves in a radius direction of a mating face, and ends of spews generated when the vulcanization is conducted do not connect and unify one another.

4 Claims, 4 Drawing Sheets

METHOD FOR MANUFACTURING A GOLF BALL

BACKGROUND OF THE INVENTION

1. Field of the Invention

This invention relates to a manufacturing method and a mold for a golf ball.

2. Description of the Related Art

Conventionally, as a manufacturing method for vulcanization molding of a layer of a core of a multi-piece solid golf ball or an one-piece ball or a solid center of a wound-string golf ball, Japanese Patent Publication No. 3-16244 (proposed by the applicant of the present invention) is known. This is a manufacturing method as shown in FIG. 7 and FIG. 8, of which purpose is improving working efficiency of takeout from the mold, in which a partial mold 40 has four grooves 41 in radius direction on a mating face 40a and ends of spews 42 generated in vulcanization molding are connected and unified one another. And, as another method, a manufacturing method with a partial mold which has no grooves on a mating face is widely used.

However, in the above manufacturing method in which the partial mold 40 has four grooves 41, enough charge of material is required. And, much amount of material of connected portion (spews) has to be wasted. Because the purpose of the above conventional manufacturing method is working efficiency in takeout of the molded product from the mold.

On the other hand, in the manufacturing method in which the partial mold does not have grooves, enough charge is required not to generate defects such as bare because material (rubber) spews out of some portions and becomes bare with little charge. And, an extra process of low temperature is required before main vulcanization to resolve remaining stress generated by the much charge and fulfill sphericity after the vulcanization molding. That is to say, cycle time is extended and productivity is reduced thereby.

It is therefore an object of the present invention to provide a manufacturing method and a mold for golf ball with which charge is little (without generating defection such as bare). And, it is another object of the present invention to provide a manufacturing method and a mold for golf ball with which a golf ball having good sphericity is made only with the main vulcanization (namely, with short cycle time).

BRIEF DESCRIPTION OF THE DRAWINGS

The present invention will be described with reference to the accompanying drawings, in which.

DESCRIPTION OF THE PREFERRED EMBODIMENTS

Preferred embodiments of the present invention will now be described with reference to the accompanying drawings.

Figure 1:
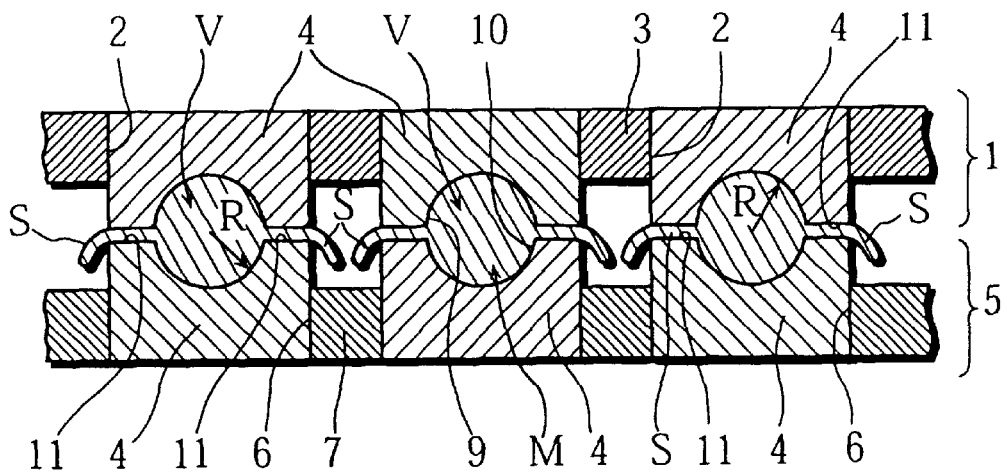
FIG. 1 is a cross-sectional front view showing a first preferred embodiment of the present invention.

FIG. 1 shows a first preferred embodiment of the present invention. 1 is an upper mold composed of an upper board 3 having circular holes 2 on grid-like positions in a plane view and partial molds 4 fitted to the holes 2. 5 is a lower mold composed of a lower board 7 having circular holes 6 on corresponding positions to the partial molds 4 of the upper mold 1 in a plane view and partial molds 4 fitted to the holes 6. The upper partial mold 4 has a semispherical concave portion 9 of a radius R formed on a mating face 4a side and the lower partial mold 4 has a semispherical concave portion 10 of the radius R formed on the mating face 4a side (refer to FIG. 3 and FIG. 4).

That is to say, the concave portions 9 and 10 form a spherical space V when the upper mold 1 contacts the lower mold 5. Material M, which includes zinc acrylate or zinc methacrylate, is fed to the concave portion 10 of the partial mold 4 of the lower mold 5 beforehand. Then, the upper mold 1 and the lower mold 5 are closed and pressed, kept heated and pressurized for a predetermined period of time for vulcanization, and a spherical one-piece ball corresponding to the spherical space V is made.

Figure 2:
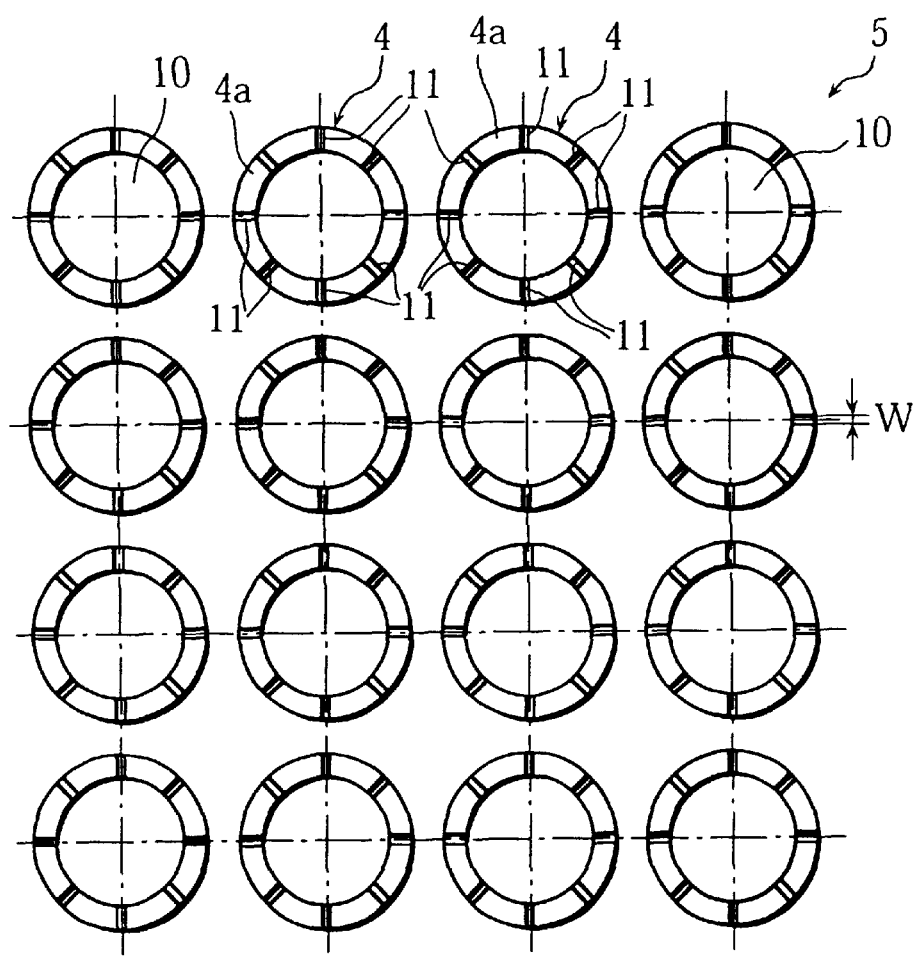
FIG. 2 is a plane view of a lower mold.
Figure 3:
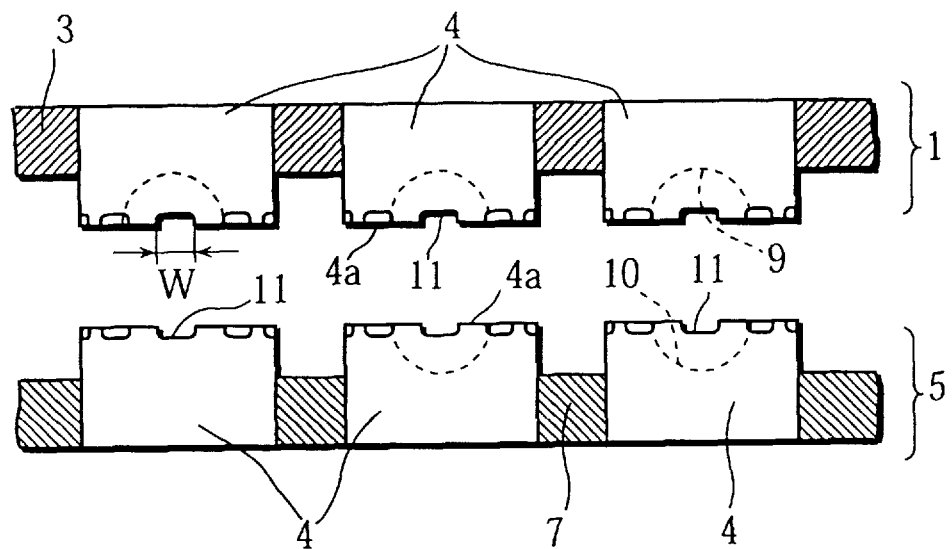
FIG. 3 is a partial cross-sectional front view showing an upper mold and the lower mold.
Figure 4:
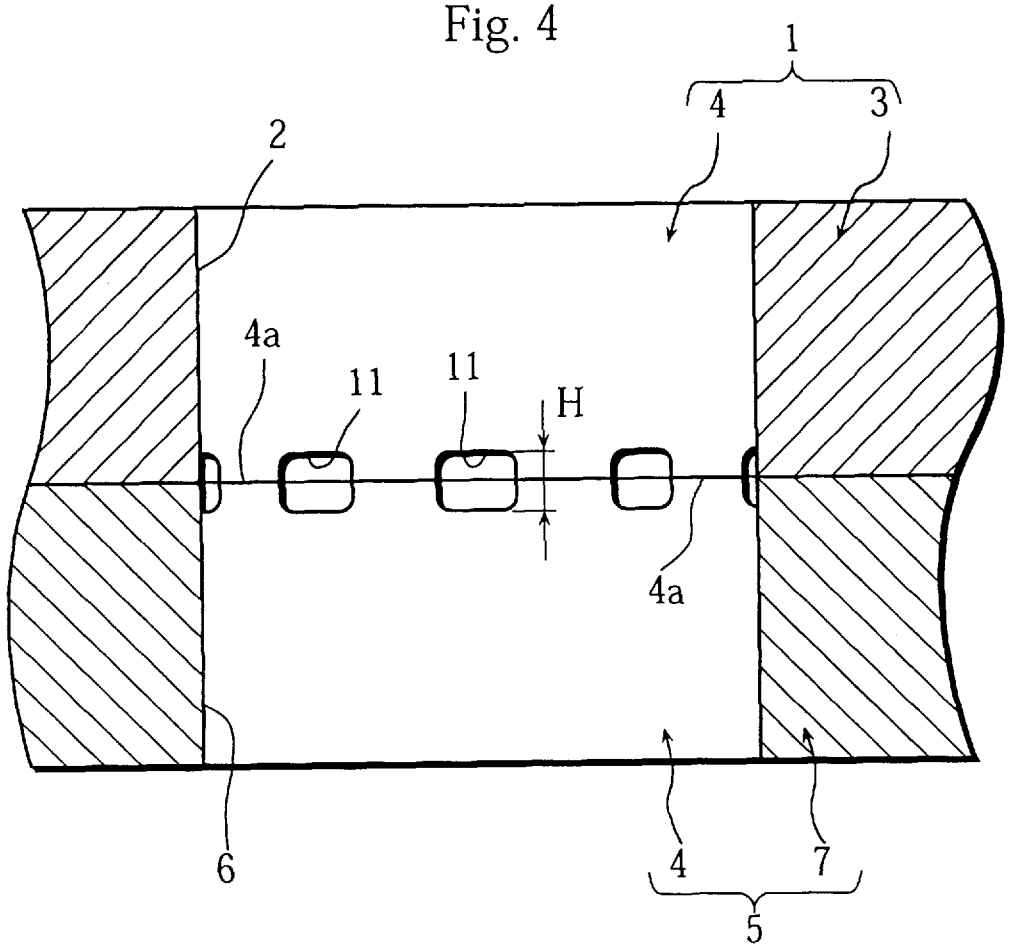
FIG. 4 is a partial cross-sectional front view showing the upper mold and the lower mold.

FIG. 2 shows a plane view of the lower mold 5, and FIG. 3 and FIG. 4 show a front view with partial cross-section of the upper mold 1 and the lower mold 5. The partial mold 4 has, for example, eight grooves 11 in radius direction of the mating face 4a. The groove 11, of which cross-section is D-shaped rotated for 90° (approximately rectangle of which angles are rounded), is formed on periphery of the partial mold 4 with uniform intervals.

And, width W of the groove 11 is arranged to be 0.3 mm to 2.8 mm. When the width W is less than 0.3 mm, spew S (refer to FIG. 1) does not run well, and sphericity of the ball becomes bad thereby. And, when the width W is more than 2.8 mm, the material M (refer to FIG. 1) is wasted.

As shown in FIG. 4, in a case that the grooves 11 are formed on the both partial molds 4 of the upper mold 1 and the lower mold 5 corresponding to each other, total depth H of two grooves 11 when the upper mold 1 and the lower mold 5 are closed is arranged to be 0.1 mm to 0.9 mm. When the depth H is less than 0.1 mm, the spew S (refer to FIG. 1) does not run well, and sphericity of the ball becomes bad thereby. And, when the depth H is more than 0.9 mm, it is difficult to take the spew S out of the groove 11.

Although not shown in Figures, the grooves 11 may be formed only on one of the partial molds 4 of the upper mold 1 or of the lower mold 5. In this case, depth of the groove on one of the partial molds 4 is the total depth H.

Figure 5:
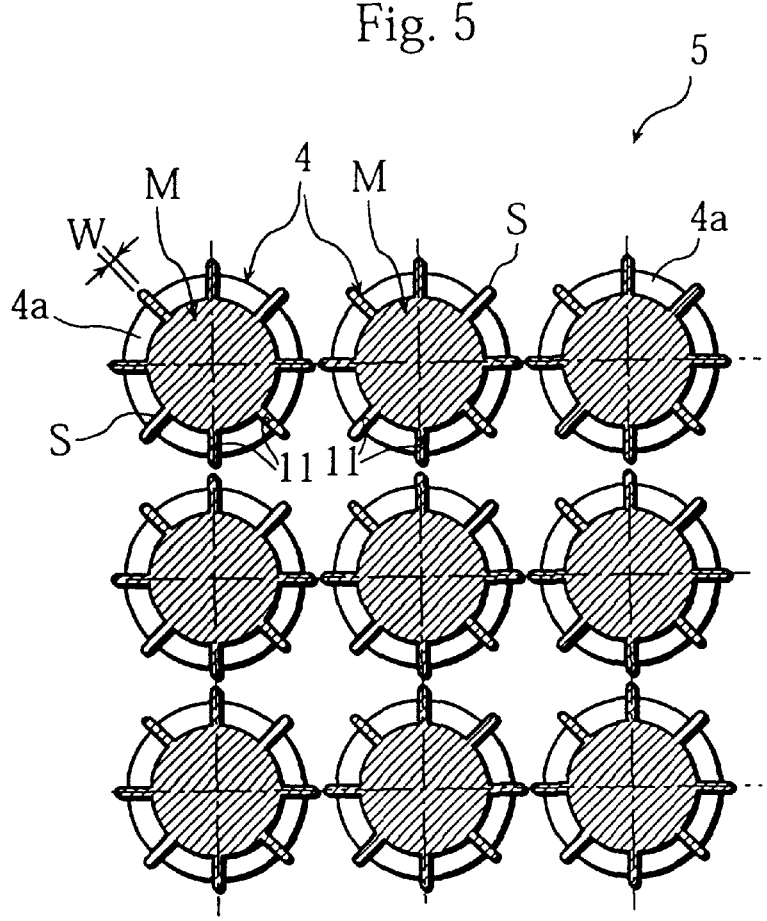
FIG. 5 is a cross-sectional plane view after vulcanization.

FIG. 5 shows a plane view of FIG. 1 in cross-section. The charge of the material M is regulated (to be little) as that the ends of the spews S, coming out of the grooves 11 in vulcanization molding, do not connect and unify one another. That is to say, the charge of the material M can be reduced.

The construction of the upper mold 1 is symmetric to that of the lower mold 5 with respect to the mating face 4a of the partial mold 4 in the closed state of the upper mold 1 and the lower mold 5.

Figure 6:
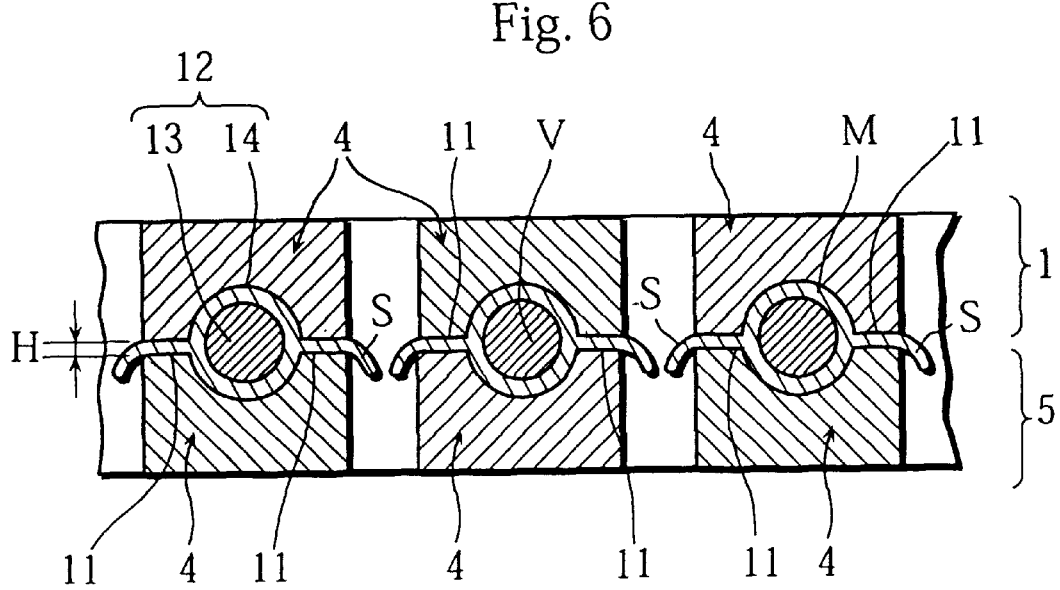
FIG. 6 is a cross-sectional front view showing a second preferred embodiment of the present invention.
Figure 7:
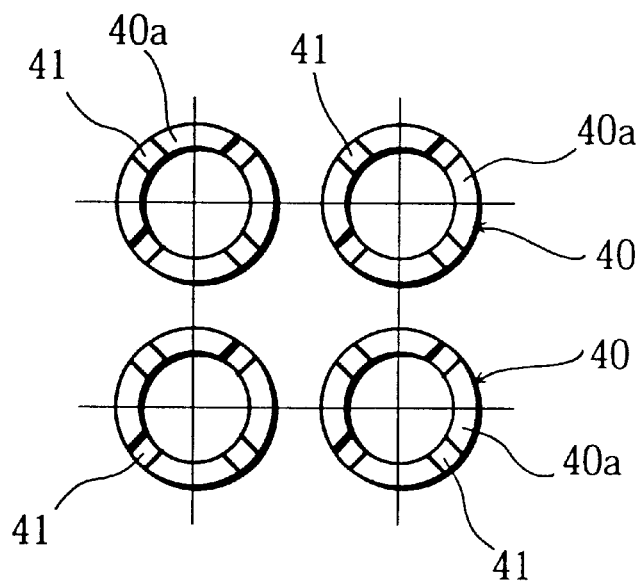
FIG. 7 is a plane view showing a conventional example.
Figure 8:
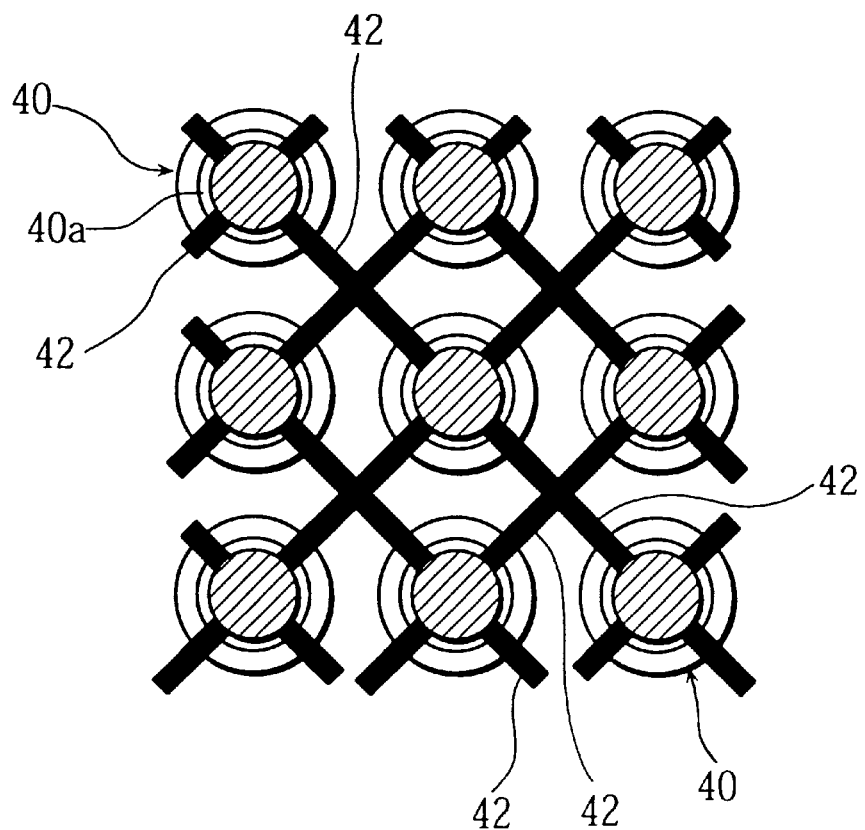
FIG. 8 is a plane view showing the conventional example.

FIG. 6 shows a second preferred embodiment of the present invention. 12 is a core of a multi-piece solid golf ball composed of a spherical first layer 13 and a second layer 14 formed as to cover the first layer 13. In production process of the core 12, the first layer 13 is made first, and then, the second layer 14 is made.

Concretely, the first layer 13 is made with a similar method to that of the one-piece golf ball in the first preferred embodiment. (the spherical first layer 13 may be made with other methods) And, material for the second layer, divided into two cup-shaped pieces composed of the material M, which includes zinc acrylate or zinc methacrylate, is placed on each of the concave portions 10 of the partial molds 4 of the lower mold 5 as to entirely cover the spherical first layer 13, heated and pressurized by the upper mold 1 and the lower mold 5 to be vulcanized, and the second layer 14 is made.

Similar to the first preferred embodiment, the partial mold 4 has eight grooves 11 in radius direction of the mating face 4a (refer to FIG. 1), and the material M is pushed out of the grooves 11 and becomes spews S. The golf ball is made with the charge of the material M with which the spews S pushed out of the grooves 11 do not connect and unify. The width W (refer to FIG. 3) and the depth H (refer to FIG. 4) of the groove 11 are arranged to be within the same range of values as that of the first preferred embodiment.

And, in the present invention, which may be modified, the material M may not include zinc acrylate and zinc methacrylate (vulcanized sulfur system). And, a solid center of a wound-string golf ball may be manufactured similar to the first preferred embodiment.

And, the number of the grooves 11 on one partial mold 4, not restricted to eight, may be appropriately increased and decreased within a range of 6 to 20. If the number of the groove 11 is less than 6, remaining stress is generated and the sphericity becomes bad thereby. On the other hand, if the number of the groove 11 is more than 20, the spews S are excessively generated and the material M is wasted. Further, strength of the mating face 4a of the partial molds 4 is decreased.

And, the configuration of the groove 11, not restricted to the rotated D-shape, may be other configurations such as half-circle. And, the grooves 11 are disposed on the periphery of the partial mold with irregular intervals.

EXAMPLES

Number of the groove 11 on the partial mold 4, the width W (mm), the depth H (mm). cross-sectional configuration of the groove 11, and composition of the material M (A or B) are set as shown in Table 1 and Table 2, vulcanizing press of the material M is conducted at 152° C. for 20 minutes, and, spew amount (g), molding time (min.), and sphericity (mm) are measured in each example. The sphericity is defined as difference between the maximum diameter and the minimum diameter of the ball.

Components of the composition A is shown in Table 1 and components of the composition B is shown in Table 2. And, outer diameter of the core is 38.3 mm.

Results of the measurement are shown in Table 3 through Table 5. Table 5 shows conventional examples.

TABLE 1

| COMPONENT | RATIO(WEIGHT RATIO) |
| --- | --- |
| BR01 | 100 |
| ZINC ACRYLATE | 25 |
| ZINC OXIDE | 22 |
| DICUMYLPEROXIDE | 1 |

TABLE 2

| COMPONENT | RATIO (WEIGHT RATIO) |
| --- | --- |
| BR01 | 100 |
| BARIUM NITRATE | 29.5 |
| ZINC OXIDE | 5 |
| SULFUR | 1 |
| VULCANIZATION ACCELERATING AGENT TT | 1.5 |
| VULCANIZATION ACCELERATING AGENT DM | 0.5 |
| ANTIOXIDANT 2246 | 0.5 |

TABLE 3

|  | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 |
| --- | --- | --- | --- | --- | --- | --- | --- | --- | --- |
| NUMBER OF GROOVES | 6 | 8 | 10 | 16 | 20 | 8 | 8 | 8 | 8 |
| WIDTH W (mm) | 1.5 | 1.5 | 1.5 | 1.5 | 1.5 | 0.3 | 1.0 | 1.5 | 2.8 |
| DEPTH H (mm) | 0.40 | 0.40 | 0.40 | 0.40 | 0.40 | 0.40 | 0.40 | 0.40 | 0.40 |
| CROSS-SECTIONAL CONFIGURATION | D-SHAPED | D-SHAPED | D-SHAPED | D-SHAPED | D-SHAPED | D-SHAPED | D-SHAPED | D-SHAPED | D-SHAPED |
| COMPOSITION | A | A | A | A | A | A | A | A | A |
| SPEW AMOUNT (g) | 0.3 | 0.4 | 0.5 | 0.8 | 1.0 | 0.1 | 0.3 | 0.4 | 0.6 |
| MOLDING TIME (min.) | 3 | 3 | 3 | 3 | 3 | 3 | 3 | 3 | 3 |
| SPHERICITY (mm) | 0.05 | 0.03 | 0.03 | 0.03 | 0.03 | 0.05 | 0.03 | 0.03 | 0.03 |

TABLE 4

|  | EXAMPLE 10 | EXAMPLE 11 | EXAMPLE 12 | EXAMPLE 13 | EXAMPLE 14 | EXAMPLE 15 |
| --- | --- | --- | --- | --- | --- | --- |
| NUMBER OF GROOVES | 8 | 8 | 8 | 8 | 8 | 8 |
| WIDTH W (mm) | 1.0 | 1.0 | 1.0 | 1.0 | 1.0 | 1.5 |
| DEPTH H (mm) | 0.10 | 0.25 | 0.40 | 0.90 | 0.50 | 0.50 |

TABLE 4-continued

| CROSS-SECTIONAL CONFIGURATION | D-SHAPED | D-SHAPED | D-SHAPED | D-SHAPED | SEMI-CIRCULAR | INVERTED TRIANGLE |
|---|---|---|---|---|---|---|
| COMPOSITION | A | A | A | A | A | A |
| SPEW AMOUNT (g) | 0.1 | 0.2 | 0.2 | 0.4 | 0.3 | 0.5 |
| MOLDING TIME (min.) | 3 | 3 | 3 | 3 | 3 | 3 |
| SPHERICITY (mm) | 0.05 | 0.03 | 0.03 | 0.03 | 0.03 | 0.03 |

| | EXAMPLE 16 | EXAMPLE 17 | EXAMPLE 18 | EXAMPLE 19 | EXAMPLE 20 |
|---|---|---|---|---|---|
| NUMBER OF GROOVES | 8 | 8 | 8 | 8 | 8 |
| WIDTH W (mm) | 1.5 | 0.2 | 2.9 | 1.5 | 2.8 |
| DEPTH H (mm) | 0.40 | 0.40 | 0.40 | 0.05 | 1.00 |
| CROSS-SECTIONAL CONFIGURATION | D-SHAPED | D-SHAPED | D-SHAPED | D-SHAPED | D-SHAPED |
| COMPOSITION | B | A | A | A | A |
| SPEW AMOUNT (g) | 0.5 | 0.05 | 0.4 | 0.3 | 0.5 |
| MOLDING TIME (min.) | 3 | 4 | 4 | 4 | 4 |
| SPHERICITY (mm) | 0.03 | 0.07 | 0.07 | 0.07 | 0.07 |

TABLE 5

| | COMPARISON EXAMPLE 1 | COMPARISON EXAMPLE 2 | COMPARISON EXAMPLE 3 |
|---|---|---|---|
| NUMBER OF GROOVES | 5 | 21 | 0 |
| WIDTH W (mm) | 1.5 | 1.5 | — |
| DEPTH H (mm) | 0.40 | 0.40 | — |
| CROSS-SECTIONAL CONFIGURATION | D-SHAPED | D-SHAPED | — |
| COMPOSITION | A | A | A |
| SPEW AMOUNT (g) | 0.1 | 1.1 | 2.1 |
| MOLDING TIME (min.) | 5 | 3 | 5 |
| SPHERICITY (mm) | 0.10 | 0.08 | 0.08 |

Examples 1 through 5 in Table 3 and comparison examples 1 and 2 in Table 5 show that the manufacturing method for golf ball has good moldability, with which spew amount is little, molding time is short, and sphericity is good, when the number of the grooves 11 is 6 to 20.

Examples 6 through 9 in Table 3 and examples 17 and 18 in Table 4 show that the manufacturing method for golf ball has good moldability when the width W of the groove 11 is 0.3 mm to 2.8 mm.

Examples 10 through 13 in Table 4, examples 8 and 9 in Table 3, and examples 19 and 20 in Table 4 show that the manufacturing method for golf ball has good moldability when the depth H of the groove 11 is 0.1 mm to 0.9 mm.

Examples 14 through 16 in Table 4 show that the manufacturing method for golf ball has good moldability also in case that the cross-sectional configuration of the groove 11 is half-circular or inverted triangle and the material M is composed of the composition B (refer to Table 2).

According to the manufacturing method for golf ball of the present invention, charge of the material M can be reduced without generating defections such as bare, golf balls having good sphericity can be made.

And, productivity is greatly improved because number of production process is reduced.

And, golf balls having good sphericity can be made because the spew S flows well. The waste of the material M can be reduced. And, the molded product is easily taken out of the mold.

Further, the range of variety of golf balls to be manufactured, to which the manufacturing method of the present invention is applicable, becomes wide.

While preferred embodiments of the present invention have been described in this specification, it is to be understood that the invention is illustrative and not restrictive, because various changes are possible within the spirit and indispensable features.

What is claimed is:

1. A method for manufacturing golf balls which comprises vulcanization by press molding of a layer of a core of a multi-piece solid golf ball or a one-piece or a solid center of a wound-string golf ball, said method comprising:

charging a material into a press mold having an upper mold and a lower mold, both upper and lower molds being defined by a plurality of adjacent partial molds, wherein each of the partial molds has a mating face and 6 to 20 grooves arranged in a radius direction of the mating face of each partial mold; and closing the press mold with the charged material therein by bringing the upper and lower molds together and vulcanizing the charged material between the closed upper and lower molds, thereby causing spews of the charged material to come out of each of the closed partial molds through the grooves, wherein each spew does not connect and unify with any other spew.

2. The method for manufacturing a golf ball as set forth in claim 1, wherein the width of the grooves is 0.3 mm to 2.8 mm and the total depth of a pair of the grooves is set to be 0.1 mm to 0.9 mm so that the spews of charge material do not connect and unify with one another when the spews of charge material come out of the partial molds.

3. The method for manufacturing a golf ball as set forth in claim 1, wherein the charge material of the layer of the core of the multi-piece solid golf ball or the one-piece ball or the solid center of the wound-string golf ball includes zinc acrylate or zinc methacrylate.

4. The method for manufacturing a golf ball as set forth in claim 2, wherein the charge material of the layer of the core of the multi-piece solid golf ball or the one-piece ball or the solid center of the wound-string golf ball includes zinc acrylate or zinc methacrylate.

* * * * *